United States Patent
Xu (10) Patent No.: US 11,963,226 B2
(45) Date of Patent: Apr. 16, 2024

(54) RANDOM ACCESS METHOD, TERMINAL DEVICE, AND NETWORK DEVICE

(71) Applicant: GUANGDONG OPPO MOBILE TELECOMMUNICATIONS CORP., LTD., Guangdong (CN)

(72) Inventor: Weijie Xu, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 580 days.

(21) Appl. No.: 17/156,467

(22) Filed: Jan. 22, 2021

(65) Prior Publication Data

US 2021/0144776 A1 May 13, 2021

Related U.S. Application Data

(63) Continuation of application No. PCT/CN2019/097859, filed on Jul. 26, 2019.

(30) Foreign Application Priority Data

Jul. 27, 2018 (CN) .......................... 201810844522.8

(51) Int. Cl.
*H04W 74/0833* (2024.01)
(52) U.S. Cl.
CPC ............... *H04W 74/0833* (2013.01)
(58) Field of Classification Search
CPC ........... H04W 74/0833; H04W 74/085; H04W 72/02; H04W 72/044; H04W 72/1268;
(Continued)

(56) References Cited

U.S. PATENT DOCUMENTS

2016/0366704 A1 12/2016 Lee et al.
2017/0150530 A1 5/2017 Kim et al.
(Continued)

FOREIGN PATENT DOCUMENTS

CN 101340725 A 1/2009
CN 102271400 A 12/2011
(Continued)

OTHER PUBLICATIONS

Notice of Allowance of the Chinese application No. 202110410629.3, dated Jan. 11, 2023. 5 pages with English translation.
(Continued)

*Primary Examiner* — Thai Nguyen
(74) *Attorney, Agent, or Firm* — PERKINS COIE LLP (57) ABSTRACT

A method for random access includes that: a terminal device acquires an association between a preamble resource and a physical uplink shared channel (PUSCH) resource; and the terminal device determines, according to the association, a preamble resource and a PUSCH resource used for the terminal device to perform random access. A method for random access includes that: a network device receives a preamble transmitted by a terminal device on a preamble resource, the preamble resource having an association with a physical uplink shared channel (PUSCH) resource; and the network device determines, according to the association between the preamble resource and the PUSCH resource, a PUSCH resource for transmitting a PUSCH by the terminal device. A terminal device and a network device are also provided.

17 Claims, 8 Drawing Sheets

A terminal device acquires an association between a preamble resource and a PUSCH resource — S301

The terminal device determines a preamble resource and a PUSCH resource according to the association — S302

(58) Field of Classification Search
CPC .............. H04W 72/53; H04W 74/004; H04W 74/0841; H04W 72/0446; H04W 72/0453; H04L 5/0053; H04L 5/0048
See application file for complete search history.

(56) References Cited

U.S. PATENT DOCUMENTS

| | | | |
|---|---|---|---|
| 2018/0205516 A1 | 7/2018 | Jung et al. | |
| 2018/0242367 A1 | 8/2018 | Kim et al. | |
| 2019/0313449 A1* | 10/2019 | Tsai | ................ H04W 72/1268 |
| 2019/0387553 A1* | 12/2019 | Gong | ................ H04W 74/0833 |
| 2020/0100297 A1* | 3/2020 | Agiwal | ................ H04L 5/0048 |

FOREIGN PATENT DOCUMENTS

| | | | | |
|---|---|---|---|---|
| CN | 102821474 | A | 12/2012 | |
| CN | 106465401 | A | 2/2017 | |
| CN | 107645322 | A | 1/2018 | |
| CN | 108282874 | A | 7/2018 | |
| CN | 108886811 | A | 11/2018 | |
| CN | 109845378 | A | 6/2019 | |
| CN | 110169189 | A | 8/2019 | |
| KR | 20140071994 | A | 6/2014 | |
| SG | 167080 | A1 | 1/2011 | |
| WO | 2013026183 | A1 | 2/2013 | |
| WO | 2017030412 | A1 | 2/2017 | |
| WO | 2018064367 | A1 | 4/2018 | |
| WO | 2018132843 | A1 | 7/2018 | |
| WO | WO-2019216586 | A1 * | 11/2019 | ........... H04L 5/0044 |
| WO | WO-2020142683 | A1 * | 7/2020 | ........ H04W 72/1263 |

OTHER PUBLICATIONS

Asustek Computer Inc. et al. "Consideration on Use Cases of 2-step RACH Procedure" 3GPP TSG-RAN WG2 Meeting # NR Ad Hoc R2-1700356, Jan. 6, 2017 (Jan. 6, 2017), sections 1 and 2.
International Search Report in the international application No. PCT/CN2019/097859, dated Sep. 18, 2019.
Second Office Action of the Chinese application No. 202110410629.3, dated Sep. 29, 2022. 19 pages with English translation.
Supplementary European Search Report in the European application No. 19840377.6, dated Aug. 5, 2021. 8 pages.
Written Opinion of the International Search Authority in the international application No. PCT/CN2019/097859, dated Sep. 18, 2019. 9 pages with English translation.
First Office Action of the European application No. 19840377.6, dated Apr. 29, 2022. 5 pages.
Samsung, "Scenarios for data transfer in Inactive and related performance requirements", 3GPP TSG-RAN WG2 Jan. 2017 NR Ad-hoc Meeting R2-1700365, Spokane, USA, Jan. 17-19, 2017. 4 pages.
Asustek, "Consideration on use cases of 2-step RACH procedure", 3GPP TSG-RAN WG2 Meeting #NR Ad Hoc R2-1700023, Spokane, USA, Jan. 17-19, 2017. 4 pages.
First Office Action of the Chinese application No. 202110410629.3, dated Jul. 11, 2022. 21 pages with English translation.
Office Action of the Indian application No. 202117005289, dated Jan. 12, 2022. 7 pages with English translation.

* cited by examiner

RANDOM ACCESS METHOD, TERMINAL DEVICE, AND NETWORK DEVICE

CROSS-REFERENCE TO RELATED APPLICATION

This application is a U.S. continuation application of International Application No. PCT/CN 2019/097859, entitled "RANDOM ACCESS METHOD, TERMINAL DEVICE, AND STORAGE MEDIUM", filed on Jul. 26, 2019, which claims priority to Chinese Patent Application No. 201810844522.8, filed on Jul. 27, 2018, the contents of which are hereby incorporated by reference in their entirety.

TECHNICAL FIELD

Embodiments of the disclosure relate to the technical field of wireless communications, and particularly to a method for random access, a terminal device, and a network device.

BACKGROUND

Many services in a 5$^{th}$ Generation (5G) New Radio (NR) system have requirements of low-delay and high-reliability.

SUMMARY

The embodiments of the disclosure provide a method for random access, a terminal device and a network device.

According to a first aspect, the embodiments of the disclosure provide a method for random access, which includes the following operations.

A terminal device acquires an association between a preamble resource and a physical uplink shared channel (PUSCH) resource.

The terminal device determines, according to the association, a preamble resource and a PUSCH resource used for the terminal device to perform random access.

A second aspect provides a terminal device, which incudes that:
 a transceiver, configured to acquire an association between a preamble resource and a physical uplink shared channel (PUSCH) resource; and
 a processor, configured to determine, according to the association, a preamble resource and a PUSCH resource used for the terminal device to perform random access.

A third aspect provides a method for random access, which includes the following operations.
 a network device receives a preamble transmitted by a terminal device on a preamble resource, the preamble resource having an association with a physical uplink shared channel (PUSCH) resource; and
 the network device determines, according to the association between the preamble resource and the PUSCH resource, a PUSCH resource for transmitting a PUSCH by the terminal device.

A fourth aspect provides a network device, which includes that:
 a transceiver, configured to receive a preamble transmitted by a terminal device on a preamble resource, the preamble resource having an association with a physical uplink shared channel (PUSCH) resource; and
 a processor, configured to determine, according to the association between the preamble resource and the PUSCH resource, a PUSCH resource for transmitting a PUSCH by the terminal device.

These aspects or other aspects of the disclosure will become clearer and easier to understand through the following descriptions about the embodiments.

DETAILED DESCRIPTION

In the related art, there is yet no effective solution to reduce a number of times of blind detection of a base station and alleviate a resource conflict while ensuring a low delay and high reliability in a random access process.

The technical solutions in the embodiments of the disclosure will be described below in combination with the drawings in the embodiments of the disclosure. It is apparent that the described embodiments are not all embodiments but part of embodiments of the disclosure. All other embodiments obtained by those of ordinary skill in the art based on the embodiments in the disclosure without creative work shall fall within the scope of protection of the disclosure.

Figure 1:
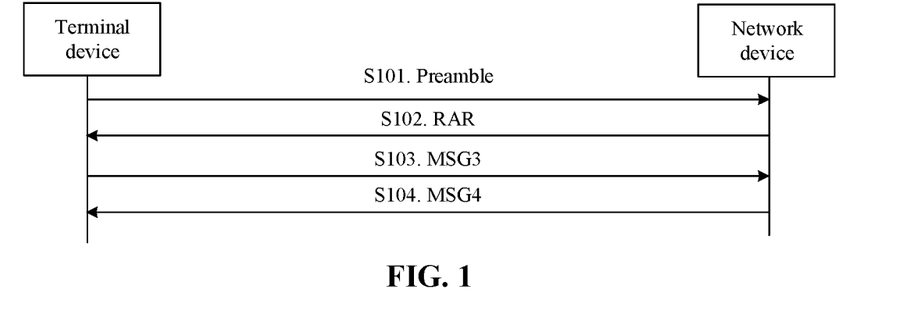
FIG. 1 is a processing flowchart of a method for random access in an NR system according to a related art.

Before the embodiments of the disclosure are described in detail, a random access channel (RACH) process for an NR system in the related art is introduced at first. As illustrated in FIG. 1, a processing flow of the RACH process includes four steps.

In S101, a terminal device sends a random access preamble through message 1 (MSG1).

In S102, a network device, responsive to detecting the random access preamble sent by the terminal device, sends a random access response (RAR) message to the terminal through an MSG2 so as to notify the terminal device of information about an uplink resource available for sending an MSG3, assign a temporary radio network temporary identity (RNTI) to the terminal device, and provide a time advance command for the terminal device, etc.

In S103, the terminal device, after receiving the RAR message, sends the MSG3 in the uplink resource specified by the RAR message, the MSG3 carrying user equipment (UE)-specific temporary identity (ID) information.

In S104, the network device sends an MSG4 to the terminal device, the MSG4 including a contention resolution message, and allocates an uplink transmission resource to the terminal device.

The terminal device, when receiving the MSG4 sent by the network device, may detect whether a UE-specific temporary ID sent by the terminal device through the MSG3 is included in the contention resolution message sent by a base station or not. If the contention resolution message includes the UE-specific temporary ID, it is indicated that the RACH process of the terminal device succeeds, otherwise it is determined that the RACH process fails and the terminal device is required to start initiating a RACH process from the first step.

Figure 2:
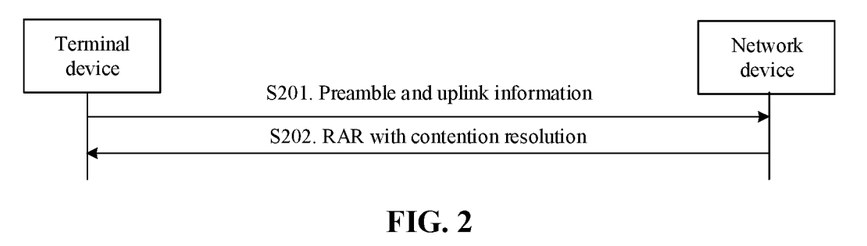
FIG. 2 is a processing flowchart of an improved method for random access according to an embodiment of the disclosure.

Considering that the network device and the terminal device are required to perform information interaction for four times to complete the RACH process and a delay of the RACH process is consequently long, for the problem of long delay of the RACH process, an improved method for random access is disclosed. As illustrated in FIG. 2, the method includes the following operations.

In S201, a terminal device sends a preamble and a PUSCH to a network device.

In S202, the network device sends an RAR with contention resolution to the terminal device.

For the improved RACH method, there is yet no effective solution to reduction of a number of times of blind detection of a base station and the problem of PUSCH resource conflict caused by selection of the same preamble by multiple terminal devices at present.

Based on the problem, the disclosure provides a method for random access. The technical solution of the method for random access according to embodiments of the disclosure may be applied to various communication systems, for example, a Global System of Mobile communication (GSM), a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, LTE Time Division Duplex (TDD), a Universal Mobile Telecommunication System (UMTS), a Worldwide Interoperability for Microwave Access (WiMAX) communication system or a future 5G system.

Figure 3:
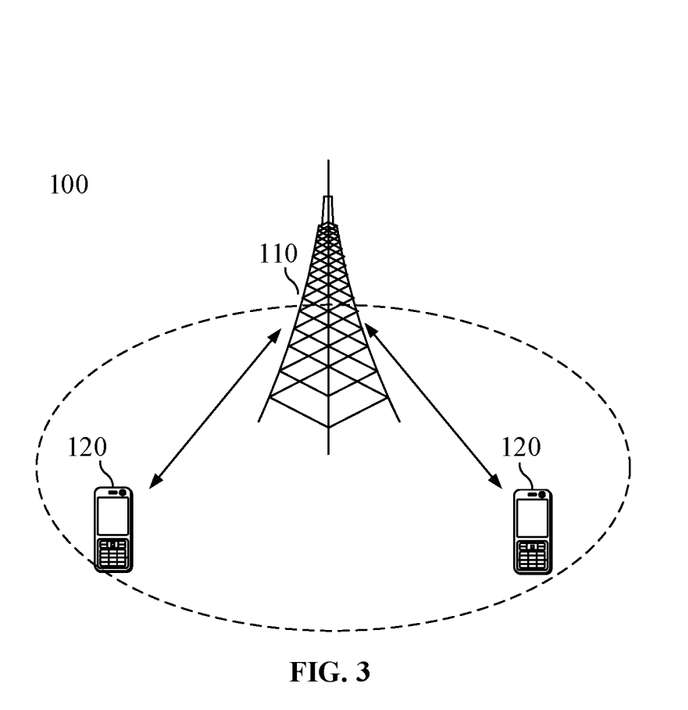
FIG. 3 is an architecture diagram of a communication system according to an embodiment of the disclosure.

Exemplarily, a communication system 100 according to the embodiments of the disclosure is illustrated in FIG. 3. The communication system 100 may include a network device 110, and the network device 110 may be a device communicating with a terminal device 120 (or called a communication terminal and a terminal). The network device 110 may provide communication coverage for a specific geographical region and may communicate with a terminal device under the coverage. Optionally, the network device 110 may be a Base Transceiver Station (BTS) in the GSM or the CDMA system, may also be a NodeB (NB) in the WCDMA system, and may further be an Evolutional Node B (eNB or eNodeB) in the LTE system or a wireless controller in a Cloud Radio Access Network (CRAN). Or the network device may be a mobile switching center, a relay station, an access point, a vehicle device, a wearable device, a hub, a switch, a network bridge, a router, a network-side device in a future 5G network, a network device in a future evolved Public Land Mobile Network (PLMN) or the like.

The communication system 100 further includes at least one terminal device 120 located within the coverage area of the network device 110. A "terminal device" used herein includes, but not limited to, a device arranged to receive/send a communication signal through a wired line connection, for example, through Public Switched Telephone Network (PSTN), Digital Subscriber Line (DSL), digital cable and direct cable connections, and/or another data connection/network, and/or through a wireless interface, for example, for a cellular network, a Wireless Local Area Network (WLAN), a digital television network like a Digital Video Broadcasting-Handheld (DVB-H) network, a satellite network and an Amplitude Modulated (AM)-Frequency Modulated (FM) broadcast transmitter, and/or another communication terminal, and/or an Internet of Things (IoT) device. The terminal device arranged to communicate through a wireless interface may be called a "wireless communication terminal", a "wireless terminal" or a "mobile terminal." Examples of a mobile terminal include, but not limited to, a satellite or cellular telephone, a Personal Communication System (PCS) terminal capable of combining a cellular radio telephone and data processing, faxing and data communication capabilities, a Personal Digital Assistant (PDA) capable of including a radio telephone, a pager, Internet/intranet access, a Web browser, a notepad, a calendar and/or a Global Positioning System (GPS) receiver, and a conventional laptop and/or palmtop receiver or another electronic device including a radio telephone transceiver. The terminal device may refer to an access terminal, UE, a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a PDA, a handheld device with a wireless communication function, a computing device, another processing device connected to a wireless modem, a vehicle device, a wearable device, a terminal device in the 5G network, a terminal device in the future evolved PLMN or the like.

Optionally, device to device (D2D) communication may be performed between terminal devices 120.

Optionally, the 5G system or the 5G network may also be called an NR system or an NR network.

One network device and two terminal devices are exemplarily illustrated in FIG. 3. Optionally, the communication system 100 may include multiple network devices and other numbers of terminal devices may be included in coverage of each network device. There is no limit made thereto in the embodiments of the disclosure.

Optionally, the communication system 100 may further include other network entities such as a network controller and a mobility management entity (MME). There is no limit made thereto in the embodiments of the disclosure.

It is to be understood that a device with a communication function in the network/system in the embodiments of the disclosure may be called a communication device. For example, for the communication system 100 illustrated in FIG. 3, communication devices may include the network device 110 and terminal device 120 with the communication function, and the network device 110 and the terminal device 120 may be the specific devices mentioned above and will not be elaborated herein. The communication devices may further include other devices in the communication system 100, for example, other network entities like a network controller and a mobility management entity. There is no limit made thereto in the embodiments of the disclosure.

It is to be understood that terms "system" and "network" in the disclosure may usually be exchanged in the disclosure. In the disclosure, term "and/or" is only an association for describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

Figure 4:
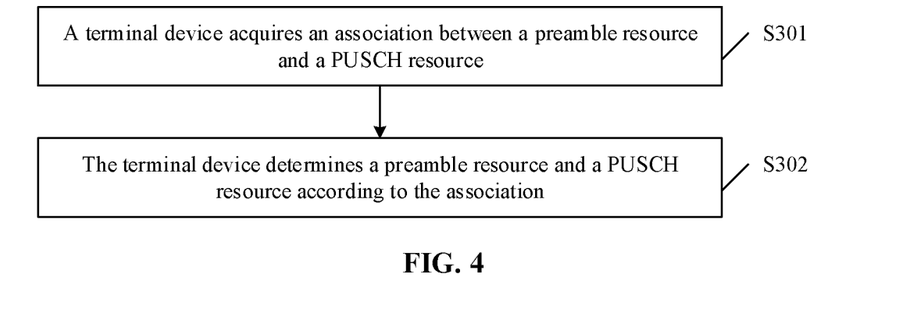
FIG. 4 is an optional processing flowchart of a method for random access according to an embodiment of the disclosure.

FIG. 4 is an optional processing flowchart of a method for random access according to an embodiment of the disclosure. The method may include the following operations.

In S301, a terminal device acquires an association between a preamble resource(s) and a PUSCH resource(s).

In some embodiments, the terminal device acquires the association, sent by a network device in a broadcast manner or the like, between the preamble resource(s) and the PUSCH resource(s), or the terminal device acquires the association between the preamble resource(s) and the PUSCH resource(s) according to a protocol.

Herein, the association between the preamble resource(s) and the PUSCH resource(s) includes that: a preamble resource corresponds to a PUSCH resource, or a preamble resource corresponds to multiple PUSCH resources, or multiple preamble resources correspond to a PUSCH resource, or multiple preamble resources correspond to multiple PUSCH resources.

The preamble resource(s) includes at least one of a time-domain resource, a frequency-domain resource, a code-domain resource, or a format. It can be understood that the preamble resource(s) includes any one of the time-domain resource, the frequency-domain resource, the code-domain resource or the format. Or, the preamble resource(s) includes any combination of the time-domain resource, the frequency-domain resource, the code-domain resource and the format. For example, the preamble resource(s) includes the time-domain resource and the frequency-domain resource; or the preamble resource(s) includes the time-domain resource, the frequency-domain resource and the format; or the preamble resource(s) includes multiple combinations of the time-domain resource, the frequency-domain resource, the code-domain resource and the format.

The PUSCH resource(s) includes at least one of a time-domain resource, a frequency-domain resource, a code-domain resource, a pilot resource, or a format. It can be understood that the PUSCH resource(s) includes the time-domain resource, the frequency-domain resource, the code-domain resource, the pilot resource or the format. Or, the PUSCH resource(s) includes the time-domain resource and the frequency-domain resource; or the PUSCH resource(s) includes the time-domain resource, the frequency-domain resource and the code-domain resource; or the PUSCH resource(s) includes multiple combinations of the time-domain resource, the frequency-domain resource, the code-domain resource, the pilot resource and the format.

In S302, the terminal device determines a preamble resource and a PUSCH resource according to the association.

Herein, the preamble resource and the PUSCH resource are used for the terminal device to perform random access. Specifically, the preamble resource is used for the terminal device to send a preamble during random access, and the PUSCH resource is used for the terminal device to send a PUSCH during random access.

In some embodiments, when the association is that a preamble resource corresponds to a PUSCH resource, the terminal device determines the preamble resource as a preamble resource for random access of the terminal device, and the terminal device determines the PUSCH resource as a PUSCH resource for random access of the terminal device. In the embodiment of the disclosure, since a preamble resource corresponds to a PUSCH resource, the network device, when receiving the preamble sent by the terminal device on the preamble resource, may determine the PUSCH resource for transmitting the PUSCH, and a number of times of blind detection of the network device is reduced.

When the association is that a preamble resource corresponds to multiple PUSCH resources, the terminal device randomly selects a PUSCH resource from the multiple PUSCH resources and determines the selected PUSCH resource as a PUSCH resource for random access of the terminal device, or the terminal device selects a PUSCH resource from the multiple PUSCH resources according to a preset policy and determines the selected PUSCH resource as a PUSCH resource for random access of the terminal device. The preset policy may be user identification information or a modulation coding scheme. The user identification information may be a UE ID. In the embodiment of the disclosure, when two or more terminal devices select the same preamble, for example, a first terminal device and a second terminal device select the same preamble resource, since a preamble resource corresponds to multiple PUSCH resources, the first terminal device and the second terminal device may correspond to a first PUSCH resource and a second PUSCH resource respectively, and the problem of PUSCH resource conflict under the condition that preambles selected by terminal devices conflict is solved. When the terminal device selects a modulation coding scheme based on its own position in a cell and selects a PUSCH from the multiple PUSCH resources based on the selected modulation coding scheme, adaptability to a transmission link may be achieved, and the data transmission efficiency may be improved.

When the association is that multiple preamble resources correspond to a PUSCH resource, the terminal device selects a preamble resource from the multiple preamble resources and determines the selected preamble resource as a preamble resource for random access of the terminal device, and the terminal device determines the PUSCH resource as a PUSCH resource for random access of the terminal device. In the embodiment of the disclosure, since a corresponding PUSCH resource is required to be reserved for a preamble resource, the same PUSCH resource may be reserved for multiple preamble resources under the condition of less access of the terminal device, and in such a manner, resource waste caused by PUSCH resource reservation may be reduced.

When the association is that multiple preamble resources correspond to multiple PUSCH resources, the terminal device selects a preamble resource from the multiple preamble resource and determines the selected preamble resource as a preamble resource for random access of the terminal device, and the terminal device randomly selects a PUSCH resource from the multiple PUSCH resources or selects a PUSCH resource according to a preset policy, and determines the selected PUSCH resource as a PUSCH resource for random access of the terminal device. The preset policy may be user identification information or a modulation coding scheme. The user identification information may be a UE ID. Based on the descriptions about the association that multiple preamble resources correspond to a PUSCH resource and the association that a preamble resource corresponds to multiple PUSCH resources, multiple preamble resources are associated with multiple PUSCH resources in the embodiment of the disclosure, so that not only may the problem of PUSCH resource conflict under the condition that the preambles selected by the terminal devices conflict be solved, but also resource waste caused by PUSCH resource reservation may be reduced.

Figure 5:
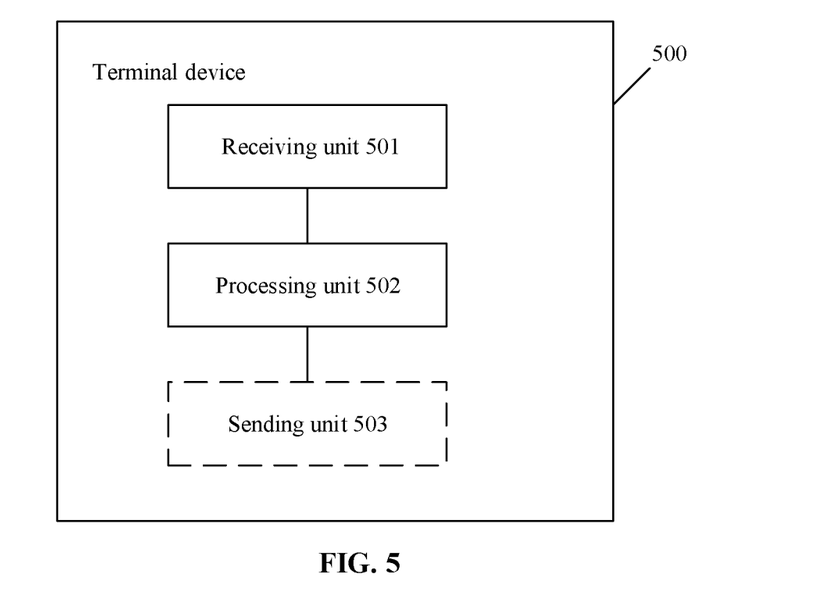
FIG. 5 is a composition structure diagram of a terminal device according to an embodiment of the disclosure.

Based on the method for random access, the embodiments of the disclosure also provide a terminal device. A composition structure of the terminal device 500 is illustrated in FIG. 5. The terminal device 500 includes a receiving unit 501 and a processing unit 502.

The receiving unit 501 is configured to acquire an association between a preamble resource(s) and a PUSCH resource(s).

The processing unit 502 is configured to determine, according to the association, a preamble resource and a PUSCH resource used for the terminal device to perform random access.

In an embodiment, the association between the preamble resource(s) and the PUSCH resource(s) includes one of the following: a preamble resource corresponds to a PUSCH resource, or a preamble resource corresponds to multiple PUSCH resources, or multiple preamble resources correspond to a PUSCH resource, or multiple preamble resources correspond to multiple PUSCH resources.

In an embodiment, the preamble resource(s) includes at least one of a time-domain resource, a frequency-domain resource, or a code-domain resource.

In an embodiment, the PUSCH resource(s) includes at least one of a time-domain resource, a frequency-domain resource, a code-domain resource, a pilot resource, or a format resource.

In an embodiment, when the association is that a preamble resource corresponds to multiple PUSCH resources, the processing unit 502 is configured to randomly select a PUSCH resource from the multiple PUSCH resources.

In an embodiment, when the association is that multiple preamble resources correspond to multiple PUSCH resources, the processing unit 502 is configured to select a preamble resource from the multiple preamble resources and randomly select a PUSCH resource from the multiple PUSCH resources.

In an embodiment, when the association is that a preamble resource corresponds to multiple PUSCH resources, the processing unit 502 is configured to select a PUSCH resource from the multiple PUSCH resources according to a preset policy.

In an embodiment, when the association is that multiple preamble resources correspond to multiple PUSCH resources, the processing unit 502 is configured to select a preamble resource from the multiple preamble resources and select a PUSCH resource from the multiple PUSCH resources according to the preset policy.

In an embodiment, the preset policy may be user identification information or a modulation coding scheme. The user identification information may be a UE ID.

In an embodiment, the terminal device 500 further includes a sending unit 503, configured to send a preamble on the preamble resource and send a PUSCH on the PUSCH resource.

In an embodiment, the receiving unit 501 is further configured to receive an RAR from a network device, the RAR being used for the terminal device to determine whether the random access succeeds or not.

Figure 6:
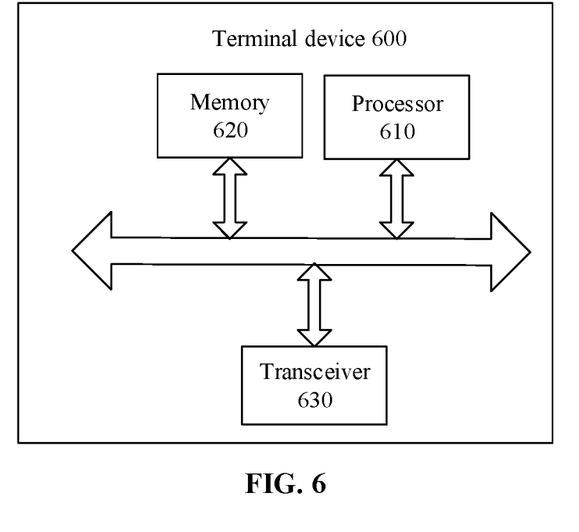
FIG. 6 is a hardware structure diagram of a terminal device according to an embodiment of the disclosure.

FIG. 6 is a hardware structure diagram of a terminal device 600 according to an embodiment of the disclosure. The terminal device 600 illustrated in FIG. 6 includes a processor 610, and the processor 610 may call and run a computer program in a memory to perform the method for random access in the embodiments of the disclosure.

Optionally, as illustrated in FIG. 6, the terminal device 600 may further include the memory 620. The processor 610 may call and run the computer program in the memory 620 to perform the method in the embodiments of the disclosure.

The memory 620 may be a device independent of the processor 610, or may be integrated into the processor 610.

Optionally, as illustrated in FIG. 6, the terminal device 600 may further include a transceiver 630, and the processor 610 may control the transceiver 630 to communicate with another device, specifically sending information or data to the another device or receiving information or data from the another device.

The transceiver 630 may include a transmitter and a receiver. The transceiver 630 may further include antennae, and the number of the antennae may be one or more.

Optionally, the terminal device 600 may specifically be a network device of the embodiments of the disclosure, and the terminal device 600 may implement corresponding flows implemented by the network device in each method of the embodiments of the disclosure. For simplicity, elaborations are omitted herein.

Optionally, the terminal device 600 may specifically be the mobile terminal/terminal device of the embodiments of the disclosure, and the terminal device 600 may perform corresponding flows implemented by the mobile terminal/terminal device in each method of the embodiments of the disclosure. For simplicity, elaborations are omitted herein.

Figure 7:
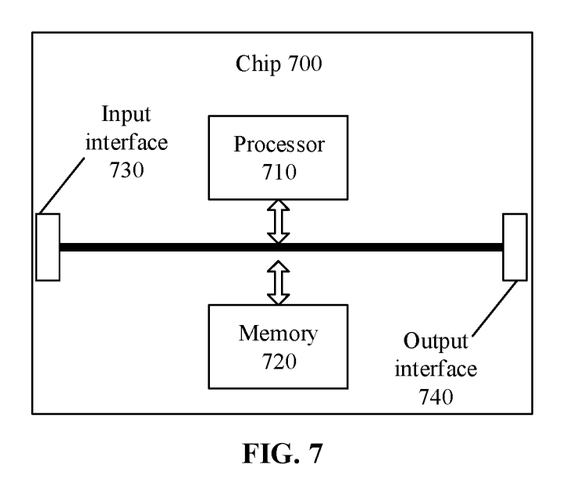
FIG. 7 is a schematic block diagram of a chip according to an embodiment of the disclosure.

FIG. 7 is a schematic structure diagram of a chip according to another embodiment of the disclosure. The chip 700 illustrated in FIG. 7 includes a processor 710, and the processor 710 may call and run a computer program in a memory to perform the method for random access in the embodiments of the disclosure.

Optionally, as illustrated in FIG. 7, the chip 700 may further include the memory 720. The processor 710 may call and run the computer program in the memory 720 to perform the method in the embodiments of the disclosure.

The memory 720 may be a device independent of the processor 710, or may be integrated into the processor 710.

Optionally, the chip 700 may further include an input interface 730. The processor 710 may control the input interface 730 to communicate with another device or chip, specifically acquiring information or data from the another device or chip.

Optionally, the chip 700 may further include an output interface 740. The processor 710 may control the output interface 740 to communicate with the another device or chip, specifically outputting information or data to the another device or chip.

Optionally, the chip may be applied to the terminal device of the embodiments of the disclosure, and the chip may perform corresponding flows implemented by the terminal device in each method of the embodiments of the disclosure. For simplicity, elaborations are omitted herein.

It is to be understood that the chip mentioned in the embodiment of the disclosure may also be called a system-level chip, a system chip, a chip system or a system on chip, etc.

Figure 8:
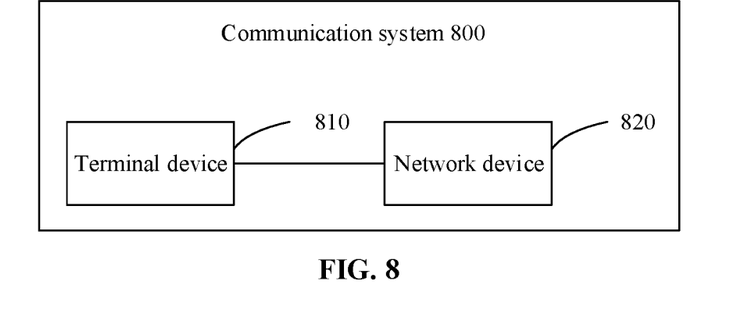
FIG. 8 is a schematic block diagram of a communication system according to an embodiment of the disclosure.

FIG. 8 is a second block diagram of a communication system 800 according to an embodiment of the disclosure. As illustrated in FIG. 8, the communication system 800 includes a terminal device 810 and a network device 820. The terminal device 810 receives an association between a preamble resource(s) and a PUSCH resource(s) from the network device 820 and determines a preamble resource and a PUSCH resource according to the association. The terminal device 810 sends a preamble to the network device on the determined preamble resource and sends a PUSCH to the network device on the determined PUSCH resource. The network device 820 sends an RAR to the terminal device 810.

The terminal device 810 may be configured to realize corresponding functions performed by the terminal device in the method, and the network device 820 may be configured to realize corresponding functions performed by the network device in the method. For simplicity, elaborations are omitted herein.

It is to be understood that the processor in the embodiment of the disclosure may be an integrated circuit chip with signal processing capability. In an implementation process, each step of the method embodiments may be completed by an integrated logical circuit of hardware in the processor or instructions in a software form. The processor may be a universal processor, a digital signal processor (DSP), an application specific integrated circuit (ASIC), a field programmable gate array (FPGA) or another programmable logical device, discrete gate or transistor logical device and discrete hardware component. Each method, step and logical block diagram disclosed in the embodiments of the disclosure may be implemented or executed. The universal processor may be a microprocessor or the processor may also be any conventional processor and the like. The steps of the method disclosed in combination with the embodiments of the disclosure may be directly embodied to be executed and completed by a hardware decoding processor or executed and completed by a combination of hardware and software modules in the decoding processor. The software module may be located in a mature storage medium in this field such as a random access memory (RAM), a flash memory, a read-only memory (ROM), a programmable ROM (PROM) or electrically erasable PROM (EEPROM) and a register. The storage medium is located in a memory, and the processor reads information from the memory, and completes the steps of the method in combination with hardware.

It can be understood that the memory in the embodiment of the disclosure may be a volatile memory or a non-transitory memory, or may include both the volatile and non-transitory memories. The non-transitory memory may be a ROM, a PROM, an erasable PROM (EPROM), an EEPROM or a flash memory. The volatile memory may be a RAM, and is used as an external high-speed cache. It is exemplarily but unlimitedly described that RAMs in various forms may be adopted, such as a static RAM (SRAM), a dynamic RAM (DRAM), a synchronous DRAM (SDRAM), a double data rate SDRAM (DDRSDRAM), an enhanced SDRAM (ESDRAM), a synchlink DRAM (SLDRAM) and a direct rambus RAM (DR RAM). It is to be noted that the memory of a system and method described in the disclosure is intended to include, but not limited to, memories of these and any other proper types.

It is to be understood that the memory is exemplarily but unlimitedly described. For example, the memory in the embodiments of the disclosure may also be an SRAM, a DRAM, an SDRAM, a DDR SDRAM, an ESDRAM, an SLDRAM and a DR RAM. That is, the memory in the embodiments of the disclosure is intended to include, but not limited to, memories of these and any other proper types.

Optionally, the computer-readable storage medium may be applied to a terminal device in the embodiments of the disclosure, and the computer program enables a computer to execute corresponding flows implemented by the terminal device in each method of the embodiments of the disclosure. For simplicity, elaborations are omitted herein.

The embodiments of the disclosure also provide a computer program product, which includes computer program instructions.

Optionally, the computer program product may be applied to a terminal device in the embodiments of the disclosure, and the computer program instructions enables the computer to execute corresponding flows implemented by the terminal device in each method of the embodiments of the disclosure. For simplicity, elaborations are omitted herein.

The embodiments of the disclosure also provide a computer program.

Optionally, the computer program may be applied to a terminal device in the embodiments of the disclosure, and the computer program runs in the computer to enable the computer to execute corresponding flows implemented by the mobile terminal/terminal device in each method of the embodiments of the disclosure. For simplicity, elaborations are omitted herein.

Those of ordinary skill in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn about that specific working processes of the system, device and unit described above may refer to the corresponding processes in the method embodiment and will not be elaborated herein for convenient and brief description.

In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the disclosure may be integrated into a processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the steps of the method in each embodiment of the disclosure. The abovementioned storage medium includes: various media capable of storing program codes such as a U disk, a mobile hard disk, a ROM, a RAM, a magnetic disk or an optical disk.

The invention claimed is:

1. A method for random access, comprising:
   acquiring, by a terminal device, an association between at least one preamble resource and at least one physical uplink shared channel (PUSCH) resource; and
   determining, by the terminal device according to the association, a preamble resource and a PUSCH resource used for the terminal device to perform random access,
   wherein the association between the at least one preamble resource and the at least one PUSCH resource comprises one of the following:
   one preamble resource corresponds to one PUSCH resource;
   one preamble resource corresponds to a plurality of PUSCH resources;
   a plurality of preamble resources correspond to one PUSCH resource; or
   a plurality of preamble resources correspond to a plurality of PUSCH resources,
   wherein the association between the at least one preamble resource and the at least one PUSCH resource is acquired by the terminal device according to a protocol.

2. The method of claim 1, wherein the preamble resource comprises at least one of:
   a time-domain resource;
   a frequency-domain resource;
   a code-domain resource; or
   a format.

3. The method of claim 1, wherein the PUSCH resource comprises at least one of:
   a time-domain resource;
   a frequency-domain resource;
   a code-domain resource;
   a pilot resource; or
   a format.

4. The method of claim 1, wherein, when the association is that one preamble resource corresponds to the plurality of PUSCH resources, determining, by the terminal device, the preamble resource and the PUSCH resource according to the association comprises:
   randomly selecting, by the terminal device, a PUSCH resource from the plurality of PUSCH resources.

5. The method of claim 1, wherein, when the association is that the plurality of preamble resources correspond to the plurality of PUSCH resources, determining, by the terminal device, the preamble resource and the PUSCH resource according to the association comprises:
   selecting, by the terminal device, a preamble resource from the plurality of preamble resources; and
   randomly selecting, by the terminal device, a PUSCH resource from the plurality of PUSCH resources; or
   selecting, by the terminal device, a PUSCH resource from the plurality of PUSCH resources according to a preset policy.

6. The method of claim 1, wherein, when the association is that one preamble resource corresponds to the plurality of PUSCH resources, determining, by the terminal device, the preamble resource and the PUSCH resource according to the association comprises:
   selecting, by the terminal device, a PUSCH resource from the plurality of PUSCH resources according to a preset policy.

7. The method of claim 1, further comprising: after determining, by the terminal device, the preamble resource and the PUSCH resource according to the association,
   sending, by the terminal device, a preamble on the preamble resource to a network device; and
   sending, by the terminal device, a PUSCH on the PUSCH resource to the network device.

8. The method of claim 7, further comprising: after sending, by the terminal device, the preamble and the PUSCH to the network device,
   receiving, by the terminal device, a random access response (RAR) from the network device, wherein the RAR is used for the terminal device to determine whether the random access succeeds.

9. A terminal device, comprising:
   a transceiver, configured to acquire an association between at least one preamble resource and at least one physical uplink shared channel (PUSCH) resource; and
   a processor, configured to determine, according to the association, a preamble resource and a PUSCH resource used for the terminal device to perform random access,
   wherein the association between the at least one preamble resource and the at least one PUSCH resource comprises one of the following:
   one preamble resource corresponds to one PUSCH resource;
   one preamble resource corresponds to a plurality of PUSCH resources;
   a plurality of preamble resources correspond to one PUSCH resource; or
   a plurality of preamble resources correspond to a plurality of PUSCH resources,
   wherein the association between the at least one preamble resource and the at least one PUSCH resource is acquired by the terminal device according to a protocol.

10. The terminal device of claim 9, wherein the preamble resource comprises at least one of:
    a time-domain resource;
    a frequency-domain resource;
    a code-domain resource; or
    a format.

11. The terminal device of claim 9, wherein the transceiver is further configured to send a preamble on the preamble resource to a network device and send a PUSCH on the PUSCH resource to the network device.

12. A method for random access, comprising:
    receiving, by a network device, a preamble transmitted by a terminal device on a preamble resource, wherein the preamble resource has an association with at least one physical uplink shared channel (PUSCH) resource; and
    determining, by the network device according to the association between the preamble resource and the at least one PUSCH resource, a PUSCH resource for transmitting a PUSCH by the terminal device,
    wherein an association between at least one preamble resource and at least one PUSCH resource comprises one of the following:
    one preamble resource corresponds to one PUSCH resource;
    one preamble resource corresponds to a plurality of PUSCH resources;
    a plurality of preamble resources correspond to one PUSCH resource; or
    a plurality of preamble resources correspond to a plurality of PUSCH resources, wherein the association between the at least one preamble resource and the at least one PUSCH resource is acquired by the terminal device according to a protocol.

13. The method of claim 12, wherein the preamble resource comprises at least one of:
   a time-domain resource;
   a frequency-domain resource;
   a code-domain resource; or
   a format.

14. The method of claim 12, further comprising:
   transmitting, by the network device, a random access response to the terminal device.

15. The method of claim 12, wherein the association between the at least one preamble resource and the at least one PUSCH resource is sent from the network device to the terminal device in a broadcast manner.

16. A network device, comprising:
   a transceiver, configured to receive a preamble transmitted by a terminal device on a preamble resource, wherein the preamble resource has an association with at least one physical uplink shared channel (PUSCH) resource; and
   a processor, configured to determine, according to the association between the preamble resource and the at least one PUSCH resource, a PUSCH resource for transmitting a PUSCH by the terminal device,
   wherein an association between at least one preamble resource and at least one PUSCH resource comprises one of the following:
   one preamble resource corresponds to one PUSCH resource;
   one preamble resource corresponds to a plurality of PUSCH resources;
   a plurality of preamble resources correspond to one PUSCH resource; or
   a plurality of preamble resources correspond to a plurality of PUSCH resources,
   wherein the association between the at least one preamble resource and the at least one PUSCH resource is acquired by the terminal device according to a protocol.

17. The network device of claim 16, wherein the preamble resource comprises at least one of:
   a time-domain resource;
   a frequency-domain resource;
   a code-domain resource; or
   a format.

* * * * *